United States Patent [19]
Patel

[11] Patent Number: 5,839,847
[45] Date of Patent: Nov. 24, 1998

[54] MOLDED ARTICLE WITH CAPTURED FASTENERS

[75] Inventor: Jayant D. Patel, Lake Forest, Calif.

[73] Assignee: McDonnell Douglas Corporation, St. Louis County, Mo.

[21] Appl. No.: 801,852

[22] Filed: Feb. 21, 1997

[51] Int. Cl.$^6$ .................................................. B29B 13/00
[52] U.S. Cl. ............................................ 403/269; 403/265
[58] Field of Search ...................... 264/274, 273, 264/271.1; 411/429, 902; 403/269, 267, 265

[56] References Cited

U.S. PATENT DOCUMENTS

| | | | |
|---|---|---|---|
| 1,411,229 | 3/1922 | Thomas | 403/265 X |
| 2,440,144 | 4/1948 | Hosking | 264/273 X |
| 2,779,061 | 1/1957 | Hosking | 264/274 X |
| 3,074,292 | 1/1963 | Polmon | 264/274 X |
| 3,129,472 | 4/1964 | Hensel | 403/265 X |
| 5,110,382 | 5/1992 | Terry et al. | 264/274 X |
| 5,252,164 | 10/1993 | Mills | 156/212 |
| 5,494,542 | 2/1996 | Muller | 156/66 |

FOREIGN PATENT DOCUMENTS

| | | | |
|---|---|---|---|
| 812494 | 5/1937 | France | 264/274 |
| 53-41715 | 11/1978 | Japan | 264/274 |
| 58-84725 | 5/1983 | Japan | 264/274 |

*Primary Examiner*—Anthony Knight
*Attorney, Agent, or Firm*—Brooks & Kushman P.C.

[57] ABSTRACT

A pressure-molded article having integral attachment points is achieved by providing, during the molding process, a fastener having a base surface portion, a side surface portion, and an internal passage defining an air path from the base surface portion to the side surface portion. The fastener's base surface portion is positioned on a molding surface of a pressure-molding tool such that the passage is placed in fluid communication with a hole in the molding surface. A formable material, such as a sheet of thermoplastic material heated to a formable state, is positioned adjacent to both the molding surface and the fastener. The sheet is pressure-formed onto the molding surface while preferably evacuating the hole in the molding surface, such that air disposed between the sheet and the molding surface adjacent to the side surface portion of the fastener is drawn into the passage and down into the hole, with the sheet partially flowing into the passage to mechanically capture the fastener within the sheet.

13 Claims, 4 Drawing Sheets

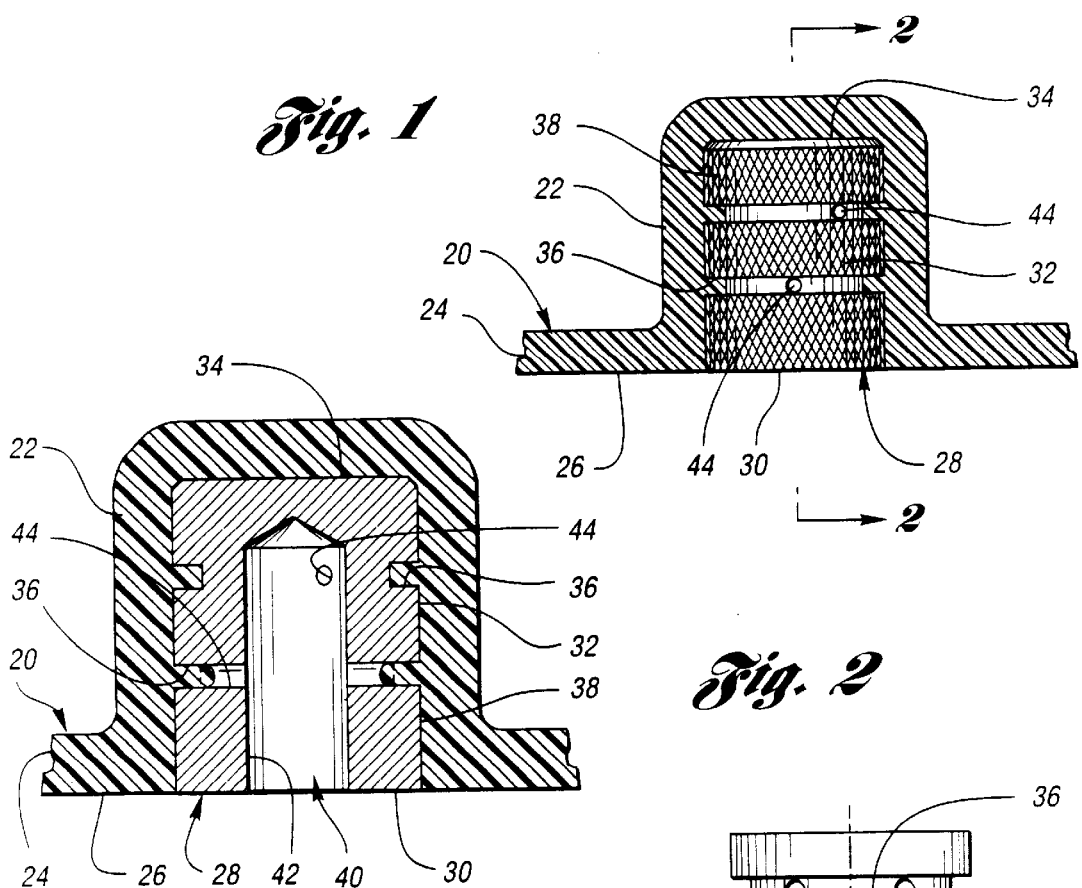
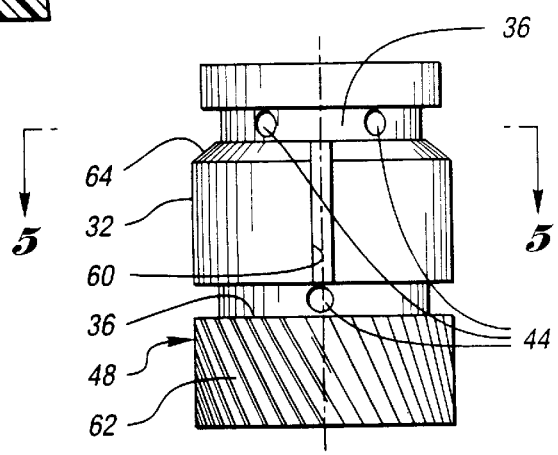
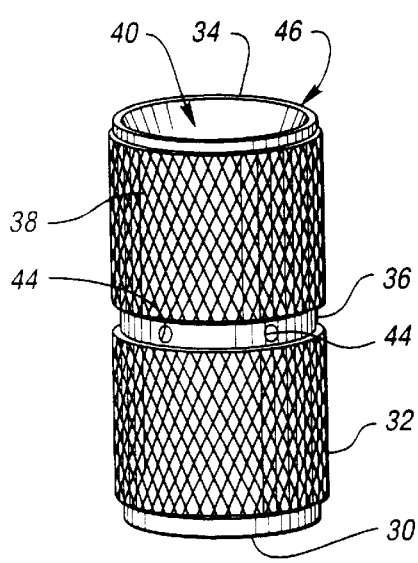
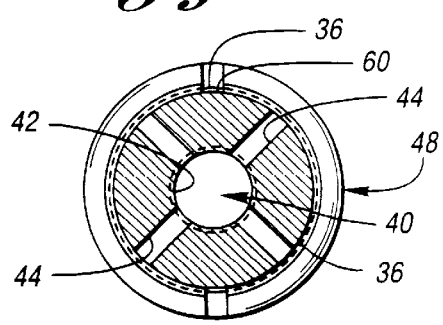

MOLDED ARTICLE WITH CAPTURED FASTENERS

TECHNICAL FIELD

The invention relates to molded articles having integrated mechanical attachment points, and to methods and fasteners used in making such molded articles.

BACKGROUND ART

One prior art method for providing attachment points on molded articles, such as those pressure-formed from a sheet of thermoplastic material, is to attach a nut plate to the molded article. Specifically, this method includes locating and predrilling holes in the molded article, and fastening the nut plate into position using suitable fasteners, such as rivets. This method thus requires tools with which to locate and drill the holes, and a riveting tool with which to rivet the nut plate in position. Often, in order to improve the aesthetics of the finished article, the method further includes the countersinking of the holes prior to fastening, with the further need for a countersink tool.

The attachment of nut plates or other suitable fasteners using this prior art method can result in the creation of induced radial—and compressive-stresses at the attachment points (e.g., the rivets) similar to the work hardening of metal. Such induced stresses may further cause stress crazing (cracking) of the molded articles when subjected to solvent fumes or due to aging.

In response to this problem, the prior art teaches the labor-intensive addition of isolators and barriers around the attachment points. Alternatively, the prior art teaches use of relatively-expensive molding materials that are themselves less susceptible to crazing. Unfortunately, the selection of these materials may be limited by the intended use to which the resulting article will be put. For example, where the molded article is to be placed in service aboard an aircraft, polyphenylsulfone is the only material featuring reduced susceptibility to crazing that also meets Federal Aviation Administration regulations for heat release (Amendment 25-67 25.853(a-1)), flammability (Amendment 25-83 25.853(a)) and smoke generation (Amendment 25-83 25.853(d)). Polyphenysulfone is an extremely expensive material which is not readily available in small quantities. Moreover, the thermoforming of polyphenylsulfone requires expensive heated tooling, higher processing heat, and allows a smaller thermoforming window tolerance resulting in excessive molded-article rejection.

Under another known method, the article is molded about the periphery of a fastener to provide an integrated fastener upon curing of the molding material. Unfortunately, air pockets forming about the periphery of the fastener during the molding process prevent the molding material from adequately engaging and encapsulating the fastener. As a result, attachment points featuring only limited resistance to torsional and tensile loading may be obtained.

Under yet another known method for providing attachment points on molded articles, an article is injection molded with preformed pockets. Metal fasteners are inserted within the pockets. The fasteners are then secured in the pockets by ultrasonic diffusion welding, in which high-frequency vibration of the fasteners is used to generate frictional heat at the interface between the fastener and the molded pocket. Unfortunately, in addition to the capital and labor requirements of such methods, the resulting welded fasteners required offer limited resistance to both torsional and tensile loads.

DISCLOSURE OF INVENTION

It is an object of the invention to provide a pressure-formed article having integrated attachment points.

It is also an object of the invention to provide a fastener adapted for integral attachment to a pressure-formed article.

Another object of the invention is to provide a method of making a pressure-formed article with mechanical attachment points in which relatively-lower-grade, less-expensive materials can be effectively used.

Another object of the invention is to provide a method of securing a fastener to a pressure-formed article which does not create induced stresses in the article.

Under the invention, an article pressure-formed from a formable material, such as a thermoplastic sheet heated to a formable state, includes a molded body having a first molded surface, and a fastener mechanically captured within the molded body to provide an attachment point on the first molded surface. Specifically, the fastener includes a base surface portion, a side surface portion, and an internal passage connecting the base surface portion to the side surface portion. A first section of the passage adjacent to the side surface portion of the fastener is filled with the formable material during pressure-forming of the article about the fastener so as to mechanically capture the fastener within the molded body.

While the invention contemplates any suitable internal and external configuration for the fastener, the first section of the passage filled with formable material during pressure-forming may preferably extend in a first direction generally parallel to the base surface portion. In order to increase the load-carrying capacity of the resulting attachment point on the molded article, the passage may preferably open into a first recess formed in the side surface portion of the fastener. While the first recess may be of any suitable configuration, the first recess may preferably include an external groove extending about the periphery of the fastener to increase pull-out (tensile) resistance, and/or an external groove extending away from the base surface portion to increase torsional resistance. The side surface portion may preferably include a textured surface to further increase the relative strength of the attachment point.

In accordance with another feature of the invention, a second section of the passage adjacent to the base surface portion may preferably define a threaded bore. Thus, the passage may itself form an attachment point for a male threaded fastener or, alternatively, a stud may conveniently be threadably inserted into the bore to provide a male attachment point. Significantly, the threaded bore may extend from the base surface portion to the top surface portion of the fastener, with the bore otherwise being sealed adjacent to the fastener's top surface portion by the article's molded body.

In accordance with another feature of the invention, the base surface portion of the fastener may preferably be aligned with the molded surface of the article. In this way, an aesthetically pleasing article surface may be provided. And, in order to facilitate the relative positioning of the fastener on the molding surface of a pressure-forming tool prior to pressure-forming the article about the fastener, the second section of the passage adjacent to the base surface portion may be adapted to receive a locating projection of the molding surface.

Under the invention, a method for making an article having integral attachment points includes providing a fastener having a base surface portion, a side surface portion, and an internal passage defining an air path from the base surface portion to the side surface portion. The fastener is positioned with its base surface portion on a molding surface of a pressure-molding tool, and a formable material is positioned adjacent to the molding surface and the fastener. The material is then pressure-formed onto the molding surface and into the passage such that air disposed between the sheet and the molding surface adjacent to the side surface portion of the fastener flows in the passage toward the base surface portion. The pressure-formed material in the passage thereafter serves to mechanically capture the fastener within the article.

In accordance with another feature of the invention, while the invention contemplates any suitable method for positioning the fastener on the molding surface, the positioning step may preferably include placing the passage in fluid communication with a hole formed in the molding surface, most preferably with the aid of a locating projection of the molding surface surrounding the hole.

Similarly, a method of securing a fastener to a pressure-formed article includes providing a fastener having an internal passage extending between a base surface portion and a side surface portion of the fastener. The fastener is positioned on a molding surface of a pressure-forming tool. A formable material is positioned adjacent to the molding surface and the fastener. The material is pressure-formed on the molding surface and about the fastener such that air and material adjacent to the fastener's side surface portion flow into the fastener's internal passage. Upon solidification of the pressure-formed material about the fastener and within the fastener's internal passage, the fastener is mechanically secured to, and integrated within, the molded article.

While any suitable pressure-forming tool may be used in practicing the invention, including blow-molding and vacuum-forming, individually or in combination, the invention is particularly well suited for use in vacuum-forming an article from a sheet of a relatively-low-cost thermoplastic material. Thus, in accordance with the invention, an exemplary method of vacuum-forming a thermoplastic article and simultaneously securing a fastener to the article includes providing a fastener having an internal passage extending between a base surface portion and a side surface portion. The fastener is positioned on the molding surface of a vacuum-forming tool such that the fastener's internal passage is placed in fluid communication with one or more of the vacuum holes provided in the molding surface. The thermoplastic sheet (heated to a formable state) is positioned adjacent to both the molding surface and the fastener, and a vacuum is provided in communication with the vacuum holes to draw the sheet material onto the molding surface, about the fastener, and into the fastener's internal passage. As before, the fastener is mechanically captured within the molded article upon solidification of the sheet material.

From the foregoing, it will be appreciated that, through use of the present method, the fastener is captured within the molded article without creating induced stress points. Thus, the invention permits use of lower-grade, relatively-less-costly materials in the manufacture of such molded articles. And, in the resulting molded article, the fastener is solidly gripped by the molded material and, hence, the article features attachment points having increased resistance to torque and pullout (tensile) loads.

While embodiments of this invention are illustrated and disclosed, these embodiments should not be construed to limit the claims. It is anticipated that various modifications and alternative designs may be made without departing from the scope of this invention.

BRIEF DESCRIPTION OF DRAWINGS

FIG. 1 is a partial view in cross-section of an exemplary pressure-formed article in which a first exemplary fastener is mechanically captured in accordance with the invention (the fastener itself being shown in side elevation for clarity of illustration);

FIG. 2 is an enlarged sectional view of the first exemplary fastener taken along line 2—2 of FIG. 1;

FIGS. 3–10 are various views of other exemplary fasteners in accordance with the invention.

BEST MODES FOR CARRYING OUT THE INVENTION

Figure 6:
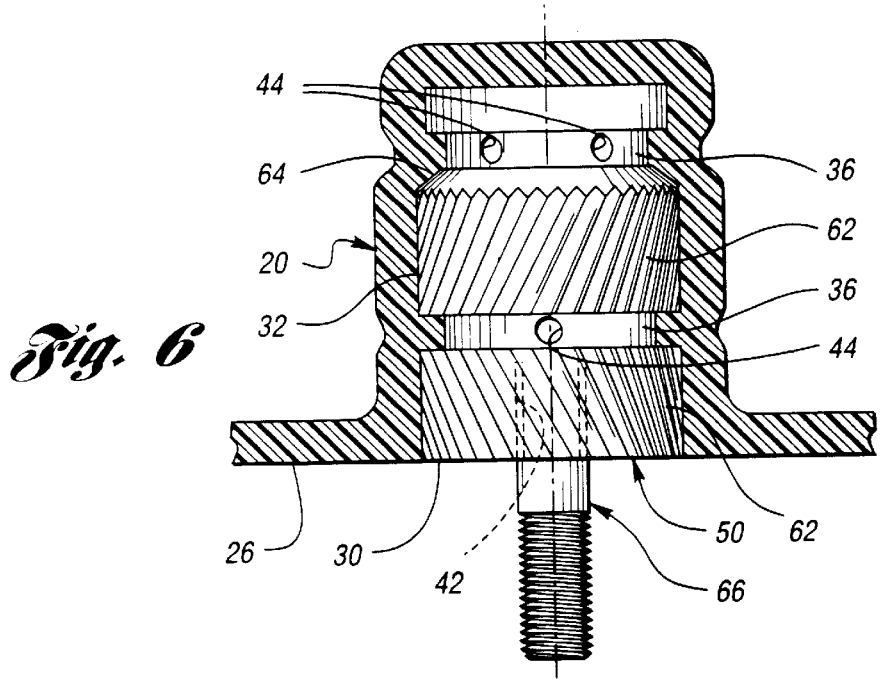
Figure 7:
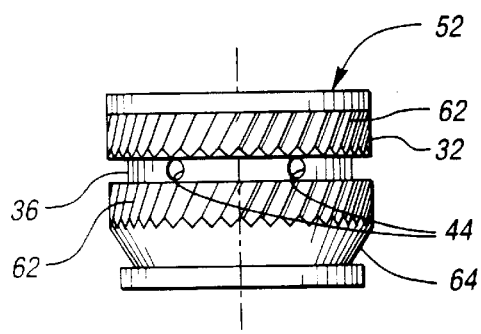
Figure 8:
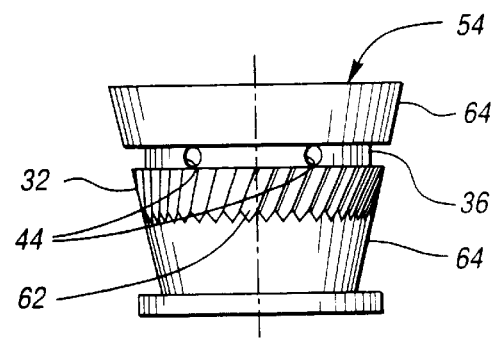

A portion of an exemplary molded article 20 pressure-formed from a formable material 22 in accordance with the invention is illustrated in cross-section in FIG. 1. The article 20 includes a molded body 24 defining a molded surface 26, and a fastener 28 mechanically captured within the molded body 24 to provide the article 20 with an attachment point on the first molded surface 26. As will be discussed more fully below, while the invention contemplates use of any suitable formable material 22, one exemplary formable material 22 suitable for use when vacuum-forming the article 20 in accordance with the invention is a sheet of thermoplastic material heated to a formable state.

The fastener 28 captured within the article 20 is shown in greater detail in FIG. 2. While the invention contemplates use of fasteners of any suitable external configuration, the fastener 28, which is itself a first exemplary fastener in accordance with another feature of the invention, includes a base surface portion 30, a side surface portion 32 and a top surface portion 34. The side surface portion 32 includes a pair of recesses, specifically, a pair of external grooves 36 extending about the periphery of the fastener 28. The side surface portion 32 of the first fastener 28 also includes a textured (knurled) surface 38, as best seen in FIG. 1. As will be discussed more fully below, the grooves 36 and textured surface 38 serve to further increase the relative strength of the mechanical interlock otherwise obtained between the fastener 28 and the molded body 24 in accordance with the invention.

While the invention contemplates use of fasteners of any suitable internal configuration, the first fastener 28 has an internal passage 40 extending from the base surface portion 30 to a plurality of points on the side surface portion 32. Specifically, the passage 40 includes a lower section adjacent to the base surface portion 30 which defines a threaded bore 42. The upper section of the passage 40 includes a plurality of radially-extending ports 44, each of which intersects the bore 42 at discrete locations along its length.

The fastener's internal passage 40 thus provides a plurality of uninterrupted internal paths along which air and material 22 adjacent to the side surface portion 32 may flow toward the base surface portion 30 during pressure-forming. As a result, in the molded article 20 of FIGS. 1–3, the deleterious formation of air pockets adjacent to the side surface portion 32 of the fastener 28 are reduced or eliminated, and the material 22 is positively molded against the fastener 28. Moreover, upon pressure-forming the article 20 about the fastener 28, the material 22 flows into the grooves 36 of the side surface portion 32 and, further, into each port 44. In this manner, the fastener 28 is further mechanically captured within the molded body 24 upon the curing of the formable material 22.

As noted above, the invention contemplates use of fasteners having any suitable external and internal configuration. By way of example only, several other exemplary fasteners 46,48,50,52,54,56,58 having suitable configurations in accordance with the invention are shown in FIGS. 4–10 (wherein like features are designed with like reference numbers for clarity).

Referring to FIGS. 3–10, these exemplary fasteners 46,48, 50,52,54,56,58 may be seen to have side surface portions 32 defining a variety of external surface features including peripherally-extending grooves 36 (having either square-shouldered or chamfered walls), longitudinally-extending grooves 60, angled ribs 62, and textured surfaces 38. As seen in FIGS. 4, 5, 7, 8 and 10, certain of these surface features may provide the fasteners 48,50,52,54,58 with frusto-conical longitudinal sections 64 when viewed in side elevation. Similarly, the invention also contemplates use, along the length of each fastener, of two or more different geometric shapes defining the periphery of the fastener when viewed in cross-section. Such geometric shapes include, without limitation, circles, ovals, ellipses, squares, rectangles and hexagons. Each of these various surface features may themselves include textured surfaces.

In accordance with the invention, the ports 44 of the fastener's internal passage 40 open into the recesses defined by each surface feature. Thus, air trapped between the formable material and these surface features during pressure-forming flows into the fastener's internal passage 40 to allow these surface features to be filled, at least in part, with the formable material 22. Once cured, the resulting mechanical interlock between these surface features and the cured material 22 substantially improves the load-carrying capacity of the resulting attachment points.

Figure 9:
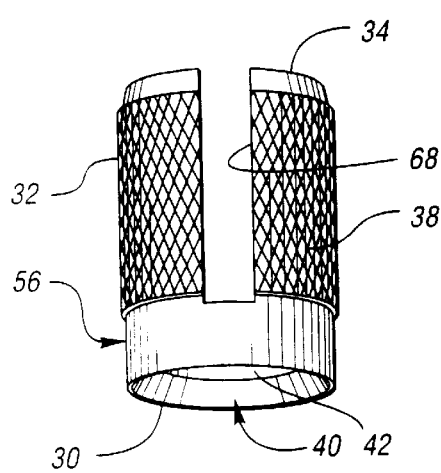
Figure 10:
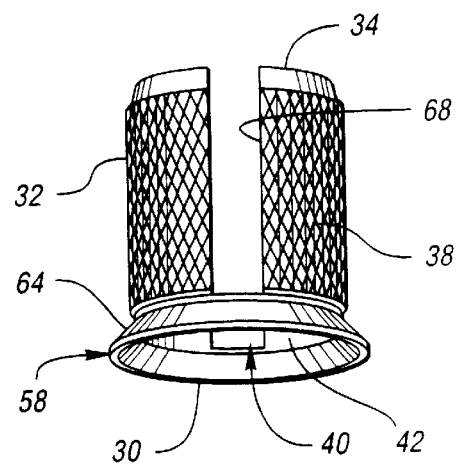

Referring to FIGS. 3, 9 and 10, certain of the exemplary fasteners 46,56,58 may be seen to include a bore 42 which extends from the base surface portion 30 through to the top surface portion 34 of the fastener 46. Upon pressure-forming the formable material about the fastener 46, the material 22 will seal the top surface portion 34 and, hence, advantageously prevent subsequent entry of moisture into the fastener's internal passage 40 which might otherwise result in corrosion.

Referring to FIG. 6, a male fastener, such as a stud 66, may be seen to be threadably inserted into the bore 42 of the captured exemplary fastener 50. In this manner, the invention advantageously provides a method of securing a male fastener in a pressure-formed article 20 in which a female fastener 50 is first captured within the article 20 during pressure-forming, whereupon the stud 66 is inserted into the bore 42 of the captured female fastener 50. Thus, the bore 42 in the captured female fastener 50 thus serves both to define the lower section of the fastener's internal passage through which air is drawn during pressure-forming and, later, to receive the stud 66.

Referring to FIGS. 9 and 10, a pair of exemplary elongate fasteners 56,58 may be seen as including longitudinal slots 68 formed in their respective top surface portions 34 with which to define the upper section of each fastener's internal passage 40. As such, the slots 68 are partially filled with formable material during pressure-forming to provided enhanced resistance to torque and tensile loads. And, while the side walls of the slots 68 are illustrated as extending in a direction generally orthogonal to each fastener's base surface portion 30, the invention contemplates use of slot side walls which are slightly angled or tapered with respect to the base surface portion 30 to provide additional resistance to torsional and/or tensile loads.

The lower section of the internal passages 40 of the elongate fasteners 56,58 of FIGS. 9 and 10 continue to be defined by a threaded bore 42 extending from the base surface portion 30 to the top surface portion 34. Upon threadably inserting a male fastener (not shown) into each fastener's threaded bore 42, each fastener 56,58 will gradually expand proximate to its top surface portion 34. The textured surface 38 of each fastener's side surface portion 32 will correspondingly bed itself into the cured material 22 to provide even greater resistance to torsional and tensile loads.

Figure 11:
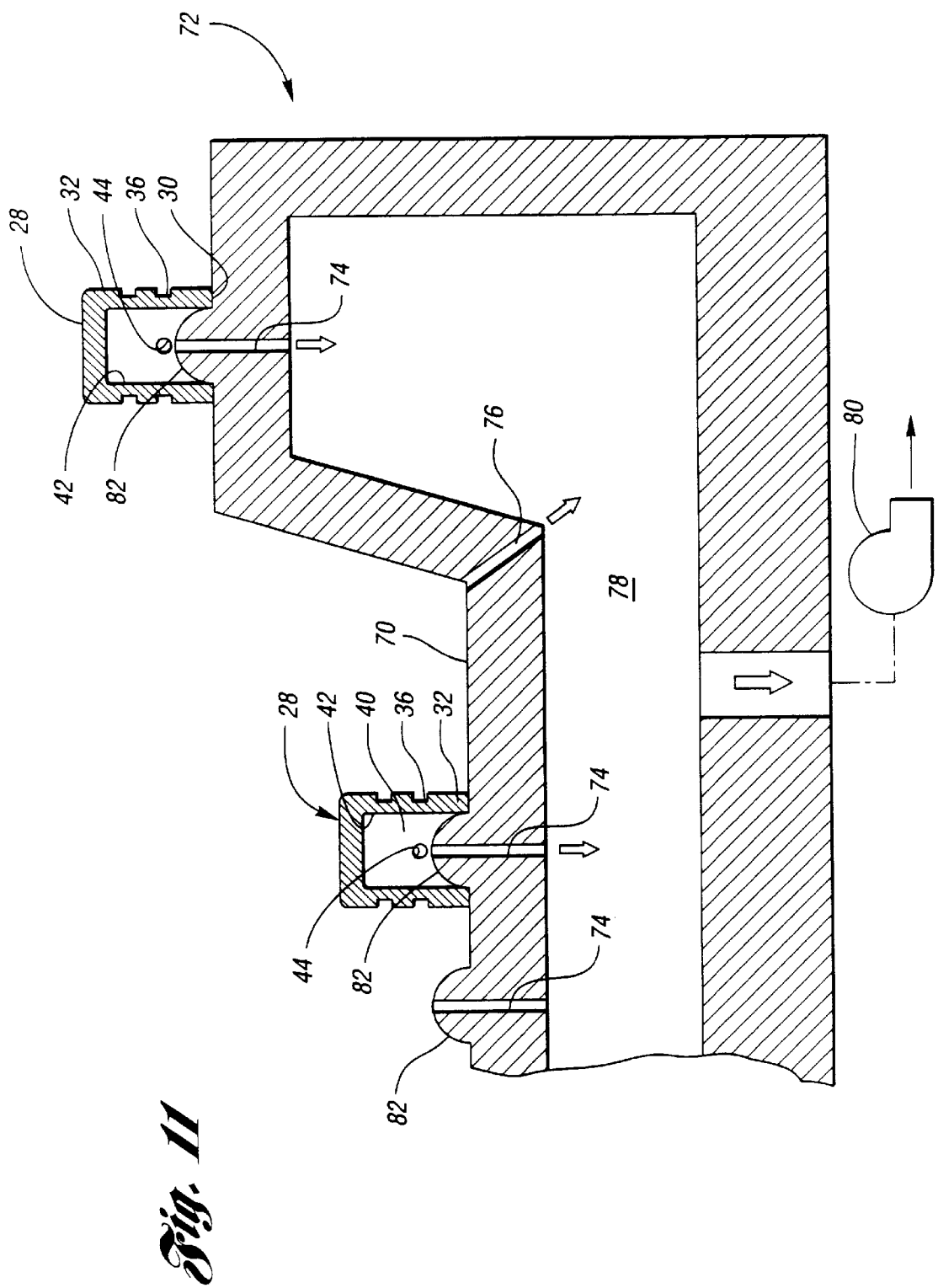
FIGS. 11 and 12 schematically illustrate an exemplary method of vacuum-forming an article from a formable material in accordance with the invention.
Figure 12:
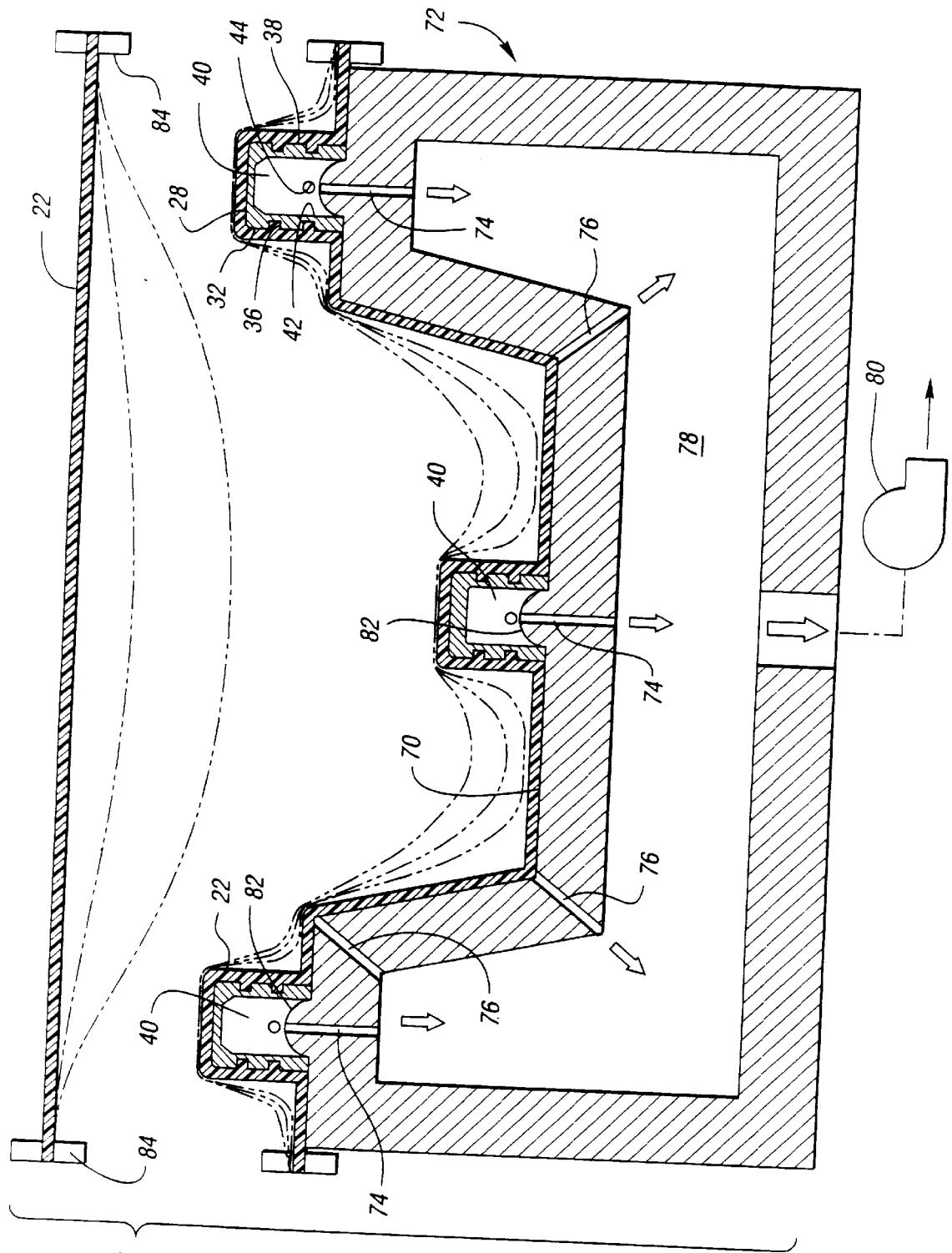

An exemplary method of making the article 20 from the formable material 22, for example, a sheet of thermoplastic material heated to a formable state, while providing the article 20 with a plurality of integrated attachment points is shown schematically in FIGS. 11 and 12. In this regard, it is noted that the invention contemplates use of any suitable pressure-forming process, that is, any suitable process which employs positive and/or negative forming pressures, with which to mold the article 20 while forcing the formable material 22 into both the various surface features of each fastener 28 and the upper section of each fastener's internal passage 40. Thus, while the exemplary method of FIGS. 11 and 12 employs vacuum-forming, it will be appreciated that the invention is not intended to be so limited.

Specifically, the method includes providing a plurality of fasteners as described above, such as the first exemplary fasteners 28, each with an internal passage 40 extending between the base surface portion 30 and the side surface portion 32 through which air and formable material 22 adjacent to the side surface portion 32 flow toward the base surface portion 30 upon pressure-forming the article 20 about the fastener 28.

Referring to FIG. 11, the fasteners 28 are positioned onto a molding surface 70 of a vacuum mold 72 such that the internal passage 40 of each fastener 28 is placed in fluid communication at least one vacuum hole 74 which, along with each of the mold's other vacuum holes 76, leads via a central vacuum chamber 78 to a vacuum source, such as a vacuum pump 80. While any suitable mechanism may be used to position the fasteners 28 on the molding surface 70 so that the resulting attachment points will be properly located upon the molded article 20, the molding surface 70 may preferably include a plurality of locating projections 82 surrounding each vacuum hole 74 upon which a fastener 28 may be seated. Specifically, each locating projection 82 preferably includes a rounded or tapered exterior which is adapted to fit within the bore 42 of each fastener 28 to precisely locate the fastener 28 on the molding surface 70.

In accordance with another feature of the invention, the base surface portion 30 of each fastener 28 will be seen in FIG. 11 to be aligned with the molding surface 70. As such, the base surface portion 30 of each fastener 28 will likewise be aligned with the molded surface 26 of the finished article 20, as seen in FIG. 1. In this way, an aesthetically pleasing article surface 26 is provided.

Referring to FIG. 12, the sheet of thermoplastic material 22 heated to a formable state is then-moved from a position above the molding surface 70 (as secured by suitable clamps 84) to a position adjacent to both the molding surface 70 and each fastener 28. A vacuum is applied to the vacuum holes 74,76 by the vacuum pump 80, whereupon the sheet material 22 is drawn onto the molding surface 70, and into both the grooves 36 and textured surface 38 of the fastener's side surface portion 32 and the ports 44 of the fastener's internal passage 40. Each fastener 28 is mechanically secured within the molded article 20 upon the curing of the sheet material 22.

In accordance with another feature of the invention, during pressure-forming, the material 22 may be caused to flow the entire length of the ports 44 and partially into the bore 42 of the fastener 28 prior to curing. Thus, when a male fastener (not shown) is later inserted into the bore 42, the cured material 22 within the bore 42 tends to cause the male fastener to bind within the bore 42. In this manner, the invention may advantageously provide each attachment point on the molded article 20 with a self-locking feature.

In accordance with another feature of the invention, while the fasteners 28 used with the method described above may be formed of any suitable material, including both metallic and nonmetallic material, the fasteners 28 may advantageously be formed of a material similar to the material 22 from which the article 20 is formed. The fasteners 28 will then become integrally welded or bonded to the article 20 during pressure-forming, with bond strengths not unlike those achieved through prior art ultrasonic diffusion welding techniques.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention. For example, while the described exemplary method employs a molding surface 70 having integral locating projections 82 upon which to seat each fastener 28 and, hence, precisely position the fastener 28 within the molded article 20, the locating projections 82 may themselves comprise tubular inserts which are otherwise installed within complementary vacuum holes prior to positioning the fasteners 28 onto the molding surface 70.

Similarly, the invention alternatively contemplates use of locating holes formed within the molding surface 70 adapted to receive a suitable projection formed on the base surface portion 30 of the fastener 28. Indeed, it will be appreciated that a suitable projection on the fastener base surface 30 may conveniently comprise a male fastener, such as a threaded stud 66 as shown in FIG. 6. Of course, to the extent that the bore 42 of the fastener 28 is used in combination with the stud 66 to locate the fastener 28 on the molding surface 70, the invention correlatively contemplates either use of a tubular stud or the formation of the fastener's internal passage 40 in parallel with the stud. And, while the disclosed embodiments advantageously use the bore 42 to precisely position the fastener 28 on the molding surface 70, the invention contemplates forming one or more locating recesses in the base surface portion 30 of each fastener 28 not otherwise defining a section of the fastener's internal passage 40.

What is claimed is:

1. An article molded from a formable material, the article comprising:

a molded body having a first molded surface; and a fastener within the molded body, the fastener including a base surface portion, a side surface portion, and an internal passage connecting the base surface portion to the side surface portion, wherein a first section of the passage adjacent to the side surface portion is filled with the formable material to mechanically capture the fastener within the molded body, wherein the side surface portion includes a first recess, and the first section opens into the first recess.

2. The article of claim 1, wherein the first section extends in a first direction generally parallel to the base surface portion.

3. The article of claim 1, wherein the side surface portion includes a textured surface.

4. The article of claim 1, wherein a second section of the passage adjacent to the base surface portion defines a threaded bore.

5. The article of claim 4, wherein the fastener includes a top surface portion, and wherein the second section extends from the base surface portion to the top surface portion.

6. The article of claim 1, wherein the base surface portion is aligned with the first molded surface.

7. A fastener adapted to be mechanically integrated within an article pressure-formed onto a molding surface from a formable material, the fastener comprising:

a base surface portion, a side surface portion, wherein the side surface portion includes a first recess, and a passage defining an internal path from the side surface portion to the base surface portion along which air and formable material adjacent the side surface portion flow toward the base surface portion when the article is formed about the fastener, wherein a first section of the passage adjacent to the side surface portion opens into the first recess.

8. The fastener of claim 7, wherein the first section extends in a first direction generally parallel to the base surface portion.

9. The fastener of claim 7, wherein the first recess is an external groove extending about the periphery of the fastener.

10. The fastener of claim 7, wherein the side surface portion includes a textured surface immediately adjacent to the first recess.

11. The fastener of claim 7, wherein the first recess is an external groove extending away from the base surface portion.

12. The fastener of claim 7, wherein a second section of the passage adjacent to the base surface portion defines a threaded bore.

13. The fastener of claim 12, wherein the fastener includes a top surface portion, and wherein the second section extends from the base surface portion to the top surface portion.

* * * * *